United States Patent
Herz et al.

(10) Patent No.: US 8,285,877 B1
(45) Date of Patent: Oct. 9, 2012

(54) INTELLIGENT BACKGROUND DATA CONVERSION

(75) Inventors: William S. Herz, Hayward, CA (US); Sridhar R. Pursai, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1244 days.

(21) Appl. No.: 11/566,898

(22) Filed: Dec. 5, 2006

(51) Int. Cl.
*G06F 15/16* (2006.01)
(52) U.S. Cl. ........................................................ 709/246
(58) Field of Classification Search .................... 709/246
See application file for complete search history.

(56) References Cited

U.S. PATENT DOCUMENTS

| | | | | |
|---|---|---|---|---|
| 2003/0147631 A1* | 8/2003 | Zimmermann | | 386/95 |
| 2005/0246451 A1* | 11/2005 | Silverman et al. | | 709/231 |
| 2006/0050971 A1* | 3/2006 | Page et al. | | 382/232 |
| 2007/0162487 A1* | 7/2007 | Frailey | | 707/102 |
| 2007/0226715 A1* | 9/2007 | Kimura et al. | | 717/148 |
| 2009/0006864 A1* | 1/2009 | Hashimoto et al. | | 713/190 |

OTHER PUBLICATIONS

McFedries. "Windows® 98 Unleashed". May 1998. p. 429.*

* cited by examiner

*Primary Examiner* — Joshua Joo
*Assistant Examiner* — Bryan Lee
(74) *Attorney, Agent, or Firm* — Patterson & Sheridan LLP

(57) ABSTRACT

A method and system for performing intelligent background data conversion are disclosed. Specifically, one embodiment of the present invention sets forth a method that includes the steps of generating a task list associated with a source data and, according to the task list, converting the source data to target data as specified in a predetermined profile at any time a processing unit inactive state is detected.

20 Claims, 5 Drawing Sheets

| Priority | Metadata | Source Data |
|---|---|---|
| Urgent | Captured Source Data | File 1345687 \\MyComputer\Source\Captured |
| High | Ripped Source Data | File 3456123 \\MyComputer\Source\Ripped |
| Medium | Recorded Source Data | File 7816812 \\MyComputer\Source\Recorded |
| Low | Imported Source Data | File 8823456 \\MyComputer\Source\Imported |

INTELLIGENT BACKGROUND DATA CONVERSION

BACKGROUND OF THE INVENTION

1. Field of the Invention

The present invention generally relates to computer systems and more particularly to a method and system for performing intelligent background data conversion.

2. Description of the Related Art

Unless otherwise indicated herein, the approaches described in this section are not prior art to the claims in this application and are not admitted to be prior art by inclusion in this section.

With the popularity of portable devices capable of playing video content, the need to convert source video content to accommodate the decoding capabilities, display resolutions, and user experience of these devices has grown significantly. FIG. 1 is a simplified block diagram of a prior art computing device that performs the needed data conversions. Suppose a user of computing device 100 would like to store a certain video signal input 110, which may be a high-definition television broadcasting ("HDTV") signal, captured by a capture device 115 coupled to a graphics system 106 in a portable device 120 for display. Typically, HDTV broadcasting signals are compressed based on the Moving Picture Experts Group-2 ("MPEG-2") standard. In contrast, portable devices generally support playing back compressed video data based on the MPEG-4 standard. In a prior art approach, after video signal input 110 is captured by capture device 115 and directed to graphics system 106, graphics system 106 stores the captured MPEG-2 data in mass storage 118. These captured MPEG-2 data are referred to as the source data. Then, at the request of the user, conversion software 114 is loaded into system memory 112 to be executed by a processing unit 102. When conversion software 114 is executed, processing unit 102 retrieves the MPEG-2 data from mass storage 118, transcodes the MPEG-2 data to the MPEG-4 data required by portable device 120, and causes the transcoded MPEG-4 data to be stored in portable device 120. The MPEG-4 data are referred to as the target data.

One shortcoming with this approach is the monopolization of the processing capacity of processing unit 102 when performing data conversion, in this instance, transcoding. In other words, during the execution of conversion software 114, processing unit 102 dedicates much of its processing capacity to the transcoding operations and becomes unresponsive to requests from other processes within computing device 100. In some instances, the amount of time required to transcode the source MPEG-2 data may take a significant portion of the total time between initiating the storing request and completing the storing of the target data in portable device 120. Similar issues also exist for prior art approaches that focus on another type of data conversion, transrating. In particular, converting the bit rate of the source data to the bit rate of the target data also occupies significant processing cycles of processing unit 102 and, therefore, negatively impacts the overall performance of computing device 100.

As the foregoing illustrates, what is needed in the art is a technique that for performing data conversions that addresses at least one of the problems set forth above.

SUMMARY OF THE INVENTION

A method and system for performing intelligent background data conversion are disclosed. Specifically, one embodiment of the present invention sets forth a method, which includes the steps of generating a task list associated with source data and, according to the task list, converting the source data to target data as specified in a predetermined profile at any time a processing unit inactive state is detected.

At least one advantage of the disclosed method is the ability to perform data conversions during periods of inactivity of the processing unit, so that the processing capacity of the processing unit is not monopolized by the data conversion operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and system for performing intelligent background data conversion are disclosed. Throughout this disclosure, the term "metadata" broadly refers to data that refers to other data. Often metadata is used to bridge a semantic gap and provide context to seemingly meaningless data. In addition, the term "ripping" refers to the process of copying data from one media type, such as a Digital Versatile Disc (DVD), to a hard drive in a computing device. Also, some examples of a "computer-readable medium" referred to herein include, without limitation, non-volatile media (e.g., optical or magnetic disks) and volatile media (e.g., dynamic memory).

Figure 1:
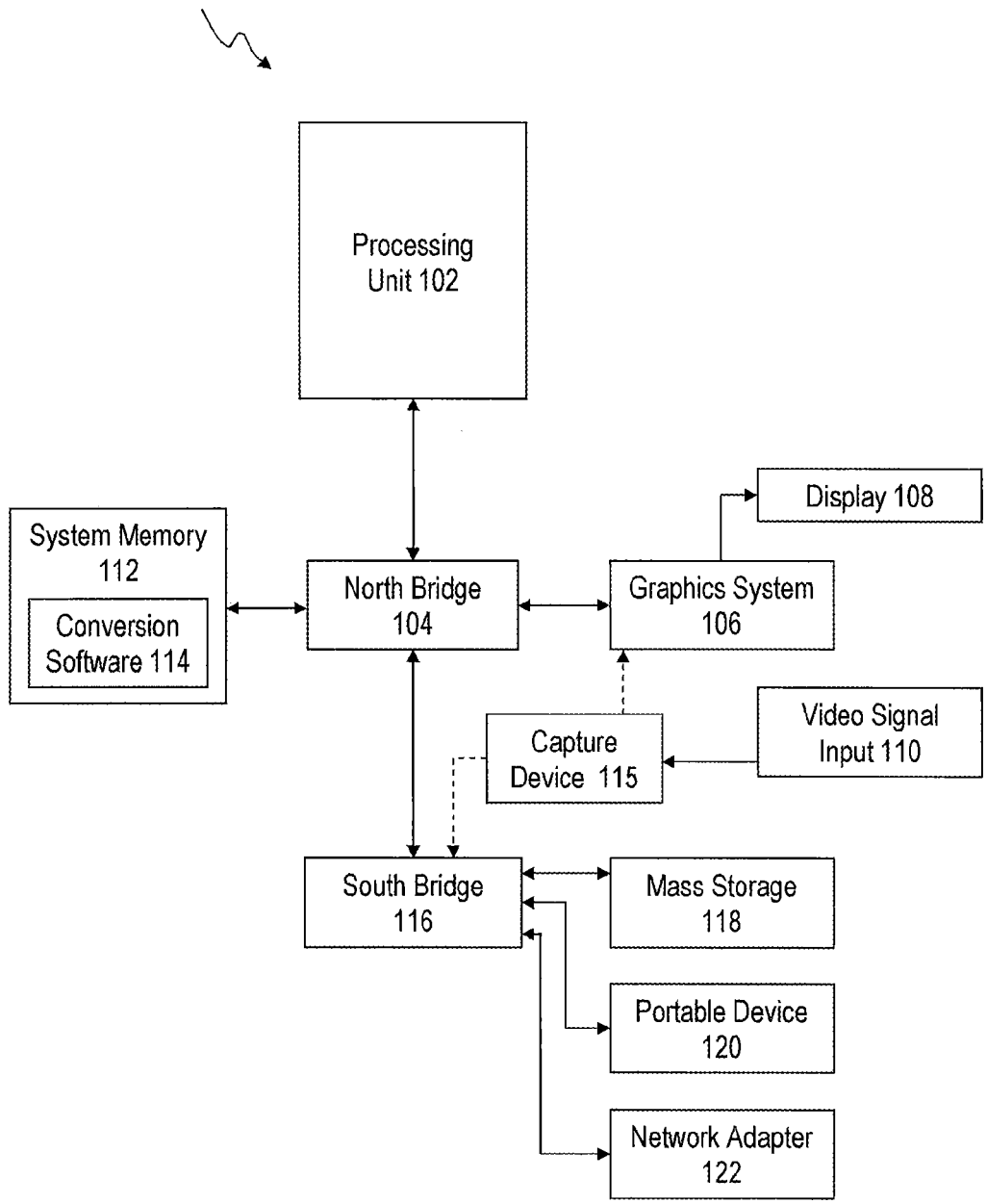
FIG. 1 a simplified block diagram of a prior art computing device that performs data conversions.
Figure 2A:
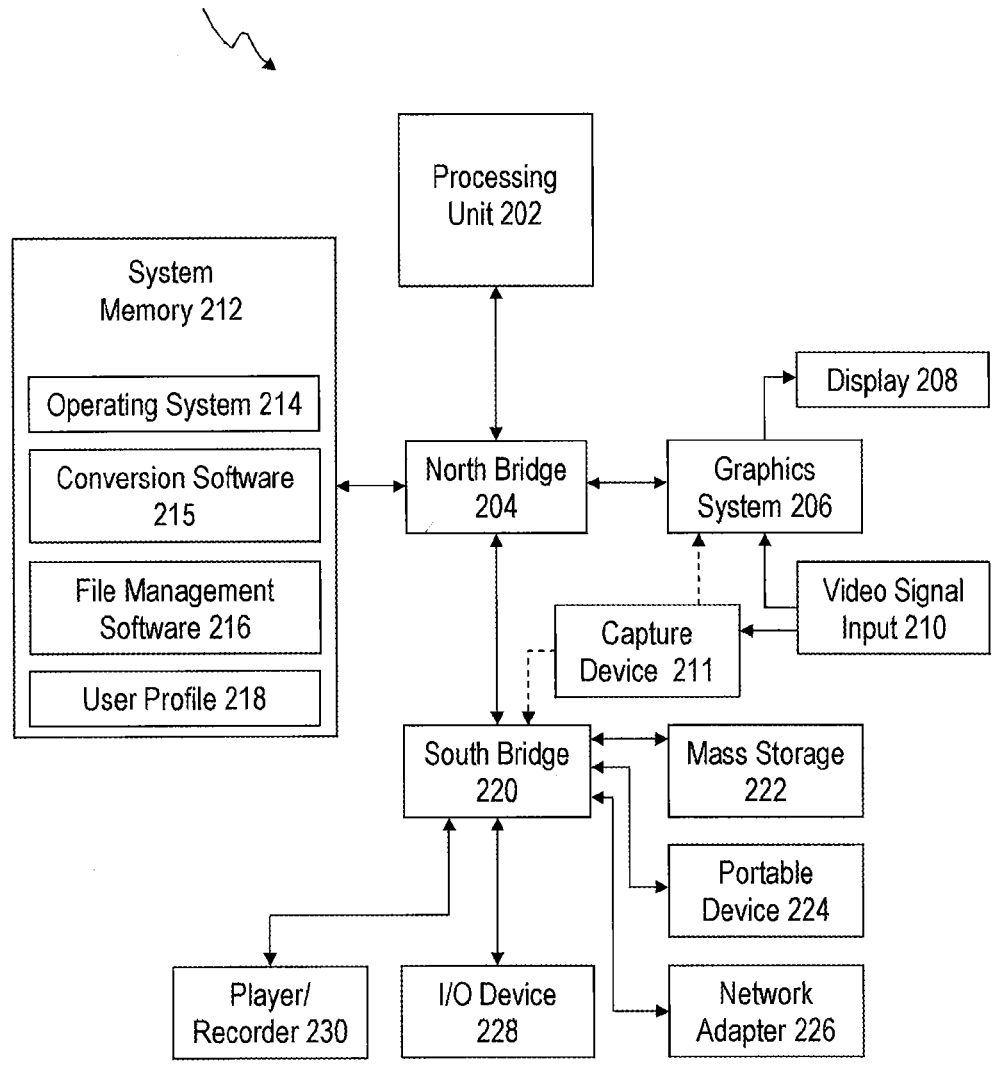
FIG. 2A is a conceptual diagram of a computing device configured to implement one or more aspects of the present invention.

FIG. 2A is a conceptual diagram of a computing device 200 configured to implement one or more aspects of the present invention. Computing device 200 includes a processing unit 202, a graphics system 206, a system memory 212, and a number of peripheral devices. Processing unit 202 communicates with system memory 212 and graphics system 206 via a north bridge 204. In one implementation, north bridge 204 supports a switch enabling a point-to-point connection between graphics system 206 and processing unit 202 via a Peripheral Component Interconnect Express (PCIe) link. Graphics system 206 typically includes a graphics processing unit (GPU) and local video memory to process video data and to drive a display 208. Graphics system 206 may further support functions such as, without limitation, motion estimation, motion compensation, discrete cosine transform (DCT)

and inverse DCT, and post processing. System memory 212 stores programming instructions and data for processing unit 202 to execute and operate on. In alternate embodiments, processing unit 202, the GPU in graphics system 206, north bridge 204, or any combination thereof, may be integrated into a single processing unit. Further, the functionality of the GPU may be included in a chipset or in some other type of special purpose processing unit or co-processor. In such embodiments, the software components currently shown to reside in system memory 212 may reside in other memory systems or may be executed by processing units other than processing unit 202. Display 270 is an output device capable of emitting a visual image corresponding to a data signal generated by graphics system 206. For example, the display may be built using a cathode ray tube (CRT) monitor, a liquid crystal display, or any other suitable display system.

Processing unit 202 also communicates with peripheral devices via a south bridge 220. Some examples of peripheral devices include, without limitation, mass storage 222, portable device 224, network adapter 226, Input/Output (I/O) device 228, and player/recorder 230. Alternatively, processing unit 202 may also communicate with a network adapter via north bridge 204.

System memory 212 includes operating system software 214, conversion software 215, file management software 216, and user profile 218. Operating system 214 manages the hardware and software resources of computing device 200. In addition, it provides an environment for other software programs, such as conversion software 215 and file management software 216, to execute in. Conversion software 215 includes programming instructions, which when executed by processing unit 202, cause processing unit 202 to perform a data conversion operation, such as transcoding or transrating as described above, or transformatting or transcripting source data to target data. File management software 216 includes programming instructions, which when executed by processing unit 202, cause processing unit 202 to generate a to-do task list for conversion software 215 based on certain input data received by computing device 200 from a user.

Figure 2B:
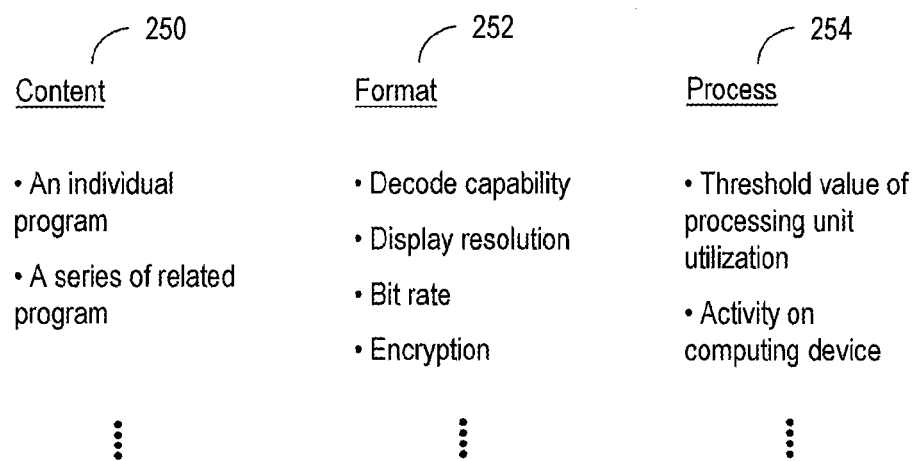
FIG. 2B is a conceptual diagram illustrating different categories of information in a user profile, according to one embodiment of the present invention.

User profile 218 contains user-selected information associated with the data conversion operation. FIG. 2B is a conceptual diagram illustrating different categories of information in user profile 218, according to one embodiment of the present invention. Category 250 includes the content that a user wants to convert. As shown, the user has selected both an individual program (e.g., a fixed-length movie) and a series of related programs (e.g., a television series). Category 252 includes the formats of target devices or target networks. Some examples of target device characteristics that can be specified include, without limitation, decode capability, display resolution, display frame rate, display line structure, display response time, color depth, chrominance subsampling, and luminance subsampling. Some examples of target network characteristics that can be specified include, without limitation, bit rate, bandwidth, encryption, file transfer protocol, and streaming protocol. Here, the user has selected the decode capability and display resolution for a target device and the bit rate and encryption for a target network. Category 254 includes the processes that can be specified to carry out the data conversion. For example, the user may designate a utilization threshold value that triggers either the initiation or the suspension of a data conversion operation. Alternatively, the user may instead designate the condition of having no activity on computing device 200 as the trigger. As shown, the user has selected the process utilizing the threshold value. When processing unit 202 is in an inactive state (i.e., when the utilization level of processing unit 202 is less than the threshold value or when there is no activity on computing device 200), conversion software 215 is executed to carry out the data conversion operation that is consistent with user profile 218. On the other hand, when processing unit 202 transitions out of the inactive state while the data conversion operation is still in progress (i.e., when the utilization level of processing unit 202 is greater than the threshold value, or when there is activity on computing device 200), the data conversion operation is pre-empted and suspended.

According to one embodiment of the present invention, before performing any data conversion operation, computing device 200 sets up certain parameters to be accessed by conversion software 215. One set of the parameters contains the aforementioned characteristics information in user profile 218. In one implementation, a software program is designed to generate and update user profile 218 (the "user profile software"), which supports a graphical interface allowing a user to easily designate any number of intended target devices or networks and also to specify the corresponding characteristics information. For instance, a user may designate three target devices, such as portable device 224, display 208 and player/recorder 230 as well as a target network, such as Fast Ethernet via network adapter 226, and specify four distinct sets of the characteristics information corresponding to these three target devices and one target network using the user profile software. The user profile software may be a standalone software program or may be a part of a larger software program, such as conversion software 215.

Another set of parameters to be accessed by conversion software 215 contain threshold values. Some examples include, without limitation, a utilization threshold value for the processing unit responsible for executing conversion software 215, threshold values indicative of the capacities of a destination system, threshold values indicative of available storage, memory, and memory bandwidths, and threshold values indicative of available network bandwidths. For discussion purposes, processing unit 202 is responsible for executing conversion software 215 and accesses the utilization threshold value. In one implementation, the utilization threshold value may be a part of user profile 218, and a user thus could set or adjust the value via the user profile software. Alternatively, the utilization threshold value may be set by an application developer of a software program, such as conversion software 215. In addition, the utilization threshold value of processing unit 202 may be represented by the following mathematic equation:

utilization threshold value=%*(total utilization level of processing unit 202−processing capacity of processing unit 202 devoted to executing data conversion operations)

In other words, even if processing unit 202 is occupied performing data conversion operations and not much else, then the utilization level of processing unit 202 may still fall below the utilization threshold value. Subsequent paragraphs will further detail data conversion operations using this utilization threshold value.

Figures 3A, 3B:
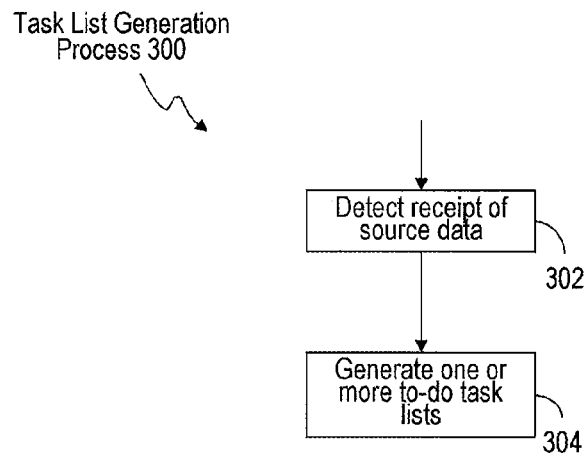
FIG. 3A is a flowchart of method steps for setting up a to-do task list, according to one embodiment of the present invention.
FIG. 3B is a simplified diagram of a metadata file, according to one embodiment of the present invention.

Yet another set of the parameters to be accessed by conversion software 215 contain the to-do task list for conversion software 215. FIG. 3A is a flowchart of method steps for setting up such a to-do task list, according to one embodiment of the present invention. Specifically, processing unit 202 executes the programming instructions of file management software 216 to carry out a task list generation process 300. In step 302, processing unit 202 detects the receipt of source data by receiving notifications from the various receiving components in computing device 200. Some examples of received source data include, without limitation, captured data, ripped data, recorded data, and imported data. For captured source data, capture device 211 captures video signal input 210, such as an incoming HDTV signal and directs the signal to graphics system 206 either directly or indirectly via south bridge 220. The software processing the captured HDTV signal notifies processing unit 202 and causes the data to be stored in mass storage 222. For ripped source data, player/recorder 230 may rip video data from a DVD to mass storage 222, and the ripping software notifies processing unit 202 of the existence of the ripped source data. For recorded source data, I/O device 228, such as a web camera, records a video clip, and the device driver for I/O device 228 notifies processing unit 202 and prompts processing unit 202 to store the recorded source data in mass storage 222. For imported source data, portable device 224, such as a camcorder, contains a certain recorded video clip and needs to export the clip to mass storage 222 for further processing, and the device driver for portable device 224 notifies processing unit 202 and prompts processing unit 202 to import the clip and store it in mass storage 222.

For each of the aforementioned source data to be stored in mass storage 222, in step 304, the programming instructions of file management software 216, when executed by processing unit 202, generate a to-do task list in the form of a metadata file. FIG. 3B is a simplified diagram of a metadata file 330, according to one embodiment of the present invention. Specifically, for each source data detected in step 302, a corresponding record in metadata file 330, such as record 332, is generated. Each record includes a number of fields, such as, without limitation, the priority to convert the source data, the metadata for the source data, and the identification (e.g., file name) and storage location of the source data (e.g., file path). In one implementation, the priority information in a priority field 334 may be specified by a user. For example, the user may specify in user profile 218 that captured source data should be converted ahead of all other types of source data. Alternatively, the priority information may be established based on the pattern of past data conversion operations. The metadata in a metadata field 336 may include information such as, without limitation, the type of source data. Lastly, the information in a source data field 338 could either be specified by the user of computing device 200 or be generated by computing device 200. It should be apparent to a person skilled in the art to recognize that metadata file 330 and the discussions above are for illustration purposes only and shall not be construed to limit the scope of the claimed invention.

Figure 3C:
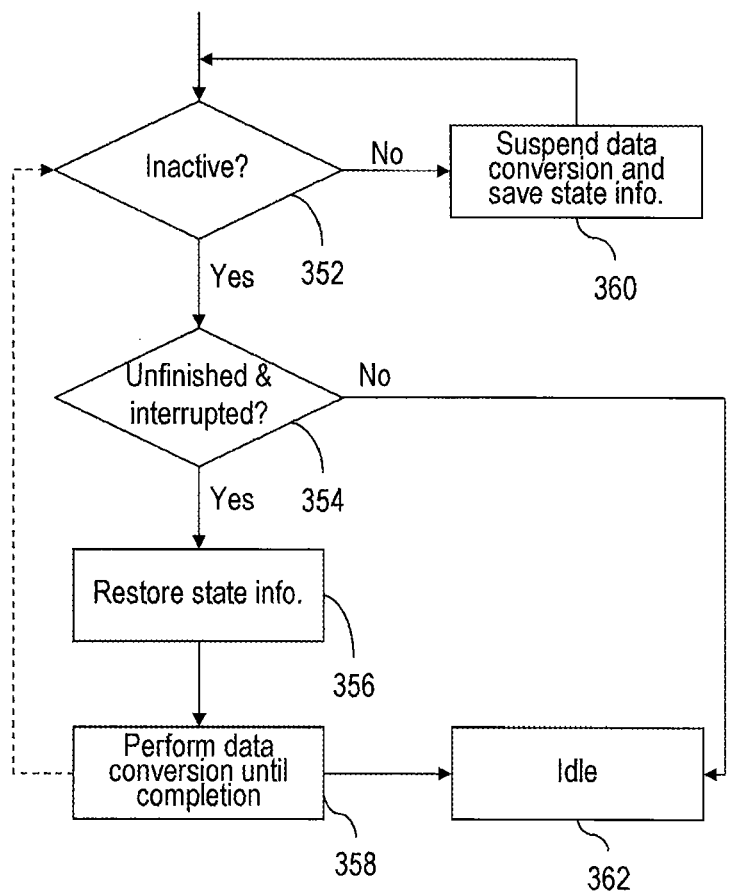
FIG. 3C is a flowchart of method steps for performing data conversions using the to-do task list during inactivity periods of a processing unit, according to one embodiment of the present invention.

File management software 216 further includes programming instructions that deliver the to-do task list to conversion software 215 from time to time. In one implementation, metadata file 330 is delivered to conversion software 215 at the time the identity of source data from a new source and the location for storing the source data become available. Using record 332 as an example, instead of waiting for the entire File 1345687 to be stored in "MyComputer\Source\Captured," record 332 of metadata file 330 can be delivered to conversion software 215 for processing at the time the file name and file path are determined. FIG. 3C is a flowchart of method steps for performing data conversions using the to-do task list during inactivity periods of a processing unit, according to one embodiment of the present invention. Here, processing unit 202 executes the programming instructions of conversion software 215 to carry out a data conversion process 350. In step 352, one implementation of conversion software 215 includes programming instructions that periodically poll the utilization level of processing unit 202 from operating system 214 and compare the polled data against the utilization threshold value corresponding to the inactive state of processing unit 202. If the polled data falls below this utilization threshold value, then in step 354, processing unit 202 determines whether there is an unfinished data conversion operation and whether that operation was previously interrupted. If an interruption occurred, then the state information relating to the data conversion operation at the time of the interruption is restored in step 356. Some examples of the state information that could be restored include, without limitation, the information specifying the portion of source data that still needs to be converted and the information indicating the type of data conversion operation designated to generate the target data. Then, in step 358, processing unit 202 carries out the data conversion operation until either processing unit 202 completes converting the source data to the target data, or conversion software 215 again polls and checks the utilization level of processing unit 202 in step 352. If the determination at step 354 indicates that no interruptions of the data conversion operation occurred, then processing unit 202 proceeds to convert the source data with the highest priority in metadata file 330, such as File 1345687 of record 332, to the target data.

Moreover, if the determination at step 352 indicates that processing unit 202 has transitioned out of the inactive state, then the on-going data conversion operation is preempted and suspended in step 360. Importantly, the state information associated with the operation at the time of the suspension is saved. This suspension is lifted whenever the state of processing unit 202 switches back to being inactive. Although the discussions above focus on a single-pass data conversion process, it should be apparent to a person skilled in the art to apply the steps disclosed in the single-pass process to a multi-pass data conversion process without exceeding the scope of the claimed invention. A multi-pass conversion process may involve converting from a first set of characteristics, to a second set of characteristics, and then to a third set of characteristics. Moreover, it should be apparent to a person with ordinary skills in the art to apply data conversion process 350 described above in a multi-threaded environment. To illustrate, suppose each thread in this multi-threaded environment is responsible for converting a video clip. In one implementation, the suspension determination in step 352 is performed on a thread-by-thread basis and is based on a different utilization threshold value than the utilization threshold value for processing unit 202. More specifically, this utilization threshold value is associated with the utilization of processing unit 202 for carrying out tasks other than executing threads to convert video clips.

To further illustrate some applications of the present invention, in conjunction with the embodiment of FIG. 2A, suppose the desired data conversion operation is to convert captured source data, a HDTV signal with the 1080i60 format (i.e., 1920×1080 pixels, interlaced encoding with 60 fields per second), to target data suitable for display on display device 208, an eXtended Video Graphics Array (XVGA) display with 1024×768 pixels, as specified in user profile 218. Suppose further record 332 in metadata file 330, as shown in FIG. 3B, corresponds to this HDTV source data signal. By following the method steps for task list generation process 300 shown in FIG. 3A, metadata file 330 and record 332 are generated. Then by following the method steps for data conversion process 350, processing unit 202 converts the HDTV signal to the desired format of the target data, consistent with the information in user profile 218, at any time the state of processing unit 202 is deemed to be inactive. In this example, the conversion from the 1080i60 format to the XVGA format includes decompressing, scaling down, and de-interlacing the HDTV signal and also reencoding the processed HDTV signal for the XVGA format. In one embodiment, the data conversion proceeds in parallel with storing the HDTV signal. Alternatively, the data conversion proceeds only after the storing of HDTV signal is completed. In another embodiment, capturing and storing the HDTV signal, performing the data conversion, and also playing back the converted data occur in parallel. It is worth noting that "storing" data herein broadly refers to both caching data in a temporary location and storing data in a permanent location. A temporary location can be memory locations in system memory 212 or a temporary file folder, such as "\\MyComputer\Temporary Folder," in mass storage 222. In contrast, a permanent location is the storage location specified in metadata file 330, such as the File 1345687 in the location, "\\MyComputer\Source\Captured," in mass storage 222.

In another example, suppose the desired data conversion operation is to convert ripped source data, a MPEG-2 file stored in mass storage 222 and copied from a DVD, to a target file for display on portable device 224, which supports MPEG-4 format, as specified in user profile 218. Suppose further record 340 in metadata file 330 corresponds to this MPEG-2 source data file. By following the same method steps for task list generation process 300 and data conversion process 350 as discussed above, processing unit 202 converts the MPEG-2 file to the desired format of the target file, consistent with the information in user profile 218, at any time the state of processing unit 202 is deemed to be inactive. Again, in one embodiment, the conversion from the MPEG-2 format to the MPEG-4 format proceeds in parallel with storing the MPEG-2 file. Alternatively, the data conversion proceeds only after the storing of MPEG-2 file is completed. In another embodiment, capturing and storing the MPEG-2 file, performing the data conversion, and also playing back the converted data occur in parallel. Again, the MPEG-2 file may be temporarily cached or permanently stored as the File 3456123 in the location, "\\MyComputer\Source\Ripped," in mass storage 222.

In yet another example, suppose the desired data conversion operation is to convert the captured source data, the HDTV signal at a first bit rate, to a target network via network adapter 226, which supports a second bit rate as specified in user profile 218. The first bit rate in this example is larger than the second bit rate, which is typical in transrating operations of this nature. Suppose further record 332 in metadata file 330 corresponds to this HDTV source data signal. By following the same method steps for task list generation process 300 and data conversion process 350 as discussed above, processing unit 202 converts the first bit rate for the HDTV signal to the second bit rate for the target network, consistent with the information in user profile 218, at any time the state of processing unit 202 is deemed to be inactive. In one embodiment, the conversion from the first bit rate to the second bit rate proceeds in parallel with storing the HDTV signal. Alternatively, the data conversion proceeds only after the storing of HDTV signal is completed. Similar to the discussions above, the HDTV signal may be temporarily cached or permanently stored as the File 1345687 in the location, "MyComputer\Source\Captured," in mass storage 222.

As has been shown, according to one or more aspects of the present invention, the data conversions from varying types of source data to distinct types of target data may be performed unobtrusively, during periods of processing unit inactivity, enabling the resulting target data to be available to the end user more quickly than with prior art systems. It should be apparent to a person with ordinary skills in the art to recognize that parameters other than the utilization level of the processing unit can affect the invocation or the operation of the aforementioned data conversions. For example, one threshold value may track available storage and/or cache, which. If the size of a new incoming file or the amount of storage needed to instantiate data conversion process 350 exceeds the available storage and/or cache on a source system according to the threshold value, then the source system rejects the new incoming file or stops the instantiation. Another threshold value may track network traffic. If the network traffic between a source system and a destination system is at a level jeopardizing the timely streaming of data to the destination system according to the threshold value, then a source system may not be permitted to initiate the streaming operation. Yet another set of threshold values include capabilities, available storage, and permitted time windows of a destination system. If transferring a file from a source system to this destination system disrupts operations of the destination system according to the threshold values (e.g., the destination system does not have the needed storage to accept the file, does not have the capabilities to receive the file, or does not have enough time to wait for the file to arrive), then a source system may not be permitted to initiate the file transfer operation.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A method for performing a data conversion operation by a processing unit, the method comprising:
   generating a task list associated with source data;
   comparing a processing unit utilization rate to a threshold value to determine that the processing unit utilization rate is below the threshold value and that the processing unit is in an inactive state, wherein the threshold value is computed as a percentage of a difference between total processing capacity of the processing unit and a portion of the total processing capacity of the processing unit that is dedicated to data conversion operations;
   based on the processing unit being in the inactive state, according to the task list and by operation of the processing unit, converting the source data to target data, as specified in a predetermined profile;
   periodically comparing the processing unit utilization rate against the threshold value; and
   suspending the data conversion operation when processing unit utilization rate rises above the threshold value and the processing unit enters an active state, or maintaining or resuming the data conversion operation when the processing unit utilization rate remains below or falls below the threshold value and the processing unit stays in or enters the inactive state.

2. The method of claim 1, wherein the task list includes metadata for the source data.

3. The method of claim 1, further comprising a step of: storing state information associated with the data conversion operation if the data conversion operation is suspended.

4. The method of claim 3, further comprising a step of: restoring the state information to continue the data conversion operation if the data conversion operation is resumed.

5. The method of claim 1, further comprising a step of tracking storage capacity.

6. The method of claim 1, further comprising a step of tracking network bandwidth.

7. The method of claim 1, further comprising a step of tracking capabilities of a destination system for the target data.

8. The method of claim 1, wherein the data conversion operation is either a single-pass operation or multi-pass operation.

9. The method of claim 1, wherein the data conversion operation is executed by a thread in a multi-threaded environment.

10. The method of claim 1, further comprising a step of storing the source data, and wherein the step of storing is performed at least partially in parallel with converting the source data to target data.

11. The method of claim 1, further comprising a step of storing the source data, and wherein the step of storing is performed at a different time than converting the source data to target data.

12. The method of claim 10, wherein the step of storing corresponds to temporarily caching the source data.

13. The method of claim 1, wherein the predetermined profile includes characteristic information for a target device.

14. The method of claim 1, wherein the predetermined profile includes characteristic information for a target network.

15. The method of claim 1, wherein the predetermined profile includes a plurality of criteria for optimizing utilization of system resources.

16. A computing device configured to perform a data conversion operation, the computing device comprising:
- a processing unit; and
- a memory system containing a file management software program, a conversion software program, and a predetermined profile, wherein:
- when executed, the file management software program causes the processing unit to generate a task list associated with source data, and
- when executed, the conversion software program compares a processing unit utilization rate to a threshold value to determine that the processing unit utilization rate is below the threshold value and that the processing unit is in an inactive state, wherein the threshold value is computed as a percentage of a difference between total processing capacity of the processing unit and a portion of the total processing capacity of the processing unit that is dedicated to data conversion operations, and
- based on the processing unit being in the inactive state and according to the task list, when executed, the conversion software program causes the processing unit to convert the source data to target data, as specified in the predetermined profile, and
- when executed, the conversion software program periodically compares the processing unit utilization rate against the threshold value, and
- when executed, the conversion software program suspends the data conversion operation when processing unit utilization rate rises above the threshold value and the processing unit enters an active state, or maintains or resumes the data conversion operation when the processing unit utilization rate remains below or falls below the threshold value and the processing unit stays in or enters the inactive state.

17. The computing device of claim 16, wherein the task list includes metadata for the source data.

18. The computing device of claim 16, wherein the conversion software program further includes programming instructions, which when executed by the processing unit, cause the processing unit to: store state information associated with the data conversion operation if the data conversion operation is suspended.

19. The computing device of claim 18, wherein the conversion software program further includes programming instructions, which when executed by the processing unit, cause the processing unit to: restore the state information associated with the data conversion operation if the processing unit resumes the data conversion operation.

20. The computing device of claim 16, wherein the processing unit performs the data conversion operation at least partially in parallel with a storing operation of the source data.

* * * * *